Aug. 19, 1930.  C. M. BULLER  1,773,474

HANGER FOR PIPES

Filed Oct. 28, 1927

INVENTOR.

Charles M. Buller

BY

ATTORNEY.

Patented Aug. 19, 1930

1,773,474

UNITED STATES PATENT OFFICE

CHARLES M. BULLER, OF MILWAUKEE, WISCONSIN, ASSIGNOR, BY MESNE ASSIGNMENTS, TO MILCOR STEEL COMPANY, OF MILWAUKEE, WISCONSIN, A CORPORATION OF DELAWARE

HANGER FOR PIPES

Application filed October 28, 1927. Serial No. 229,328.

This invention relates to a method of and a means for supporting the pipes used in hot air heating systems.

Considerable difficulty has been experienced in properly supporting the pipes of hot air heating systems. These pipes or flues are of double wall construction to provide for the desirable heat insulation and are made up of sections having their ends suitably connected or interfitted. For the greater portion of their extent at least such pipes are carried up through the walls of the structure in which they are used and are usually supported in some manner upon the studding embodied in such wall constructions. The problem is aggravated in a number of ways. One of the principal difficulties follows from the fact that the pipes are at different distances from the studding between which they extend, thus requiring a longer hanger on one side than on the other. Moreover, any supporting means or hanger that is employed must present as little projection as possible during the handling and shipping of the pipe and yet necessarily projects beyond the pipe in use. Finally, to avoid new manufacturing problems and to maintain the efficiency of the pipe structure, the organization of the hangers with the pipe structure must not involve any substantial modification of the pipe.

One of the objects of this invention is to provide a hanger or pipe supporting means for hot air pipe which is of extremely simple construction and which lies flush up against the pipe up to the time that it is to be connected to the studs and which is adapted to be easily fastened to the studs irrespective of the spacing of the same from the pipe.

In carrying out the present invention a flat and somewhat elongated metallic hanger strip is laid flush against the outer wall of the pipe and has its ends secured to the outer wall of the pipe by rivets. The portion of the hanger strip between the rivets is provided with nail receiving openings at spaced intervals. With this construction there is no projection to make it difficult or inconvenient to ship or handle the pipe. When the pipe is set up its spacing from the studding is then determined and, if one of the adjacent studs lies farther away than the other, the hanger strip may be cut at appropriately unequal distances from its rivets. After the strip has been cut into sections of appropriate lengths, the sections are swung about their pivots to project beyond the pipe and overlie the studding and are then attached to the studding by driving nails or other fastening elements through the nail receiving openings which are appropriately positioned over the studding. This construction avoids the provision of any undesirable openings in the outer wall of the pipe, the openings which receive the rivets being filled by the rivets to avoid impairing the heat insulating action of the double wall construction. Moreover, the construction is extremely simple, involving only a single strip and two rivets and yet it eliminates projections during handling and shipping and is adapted for suspending the pipe on the studding irrespective of irregular spacing.

From the foregoing it will be seen that the present invention involves a novel method of supporting the pipe of a hot air heating system which consists in permanently though pivotally securing the ends of a flat, elongated hanger strip to and flush up against the pipe, severing the hanger strip in between its ends into sections of proper length, rotating the sections to overlie the studs and then securing the sections to their respective studs.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1:
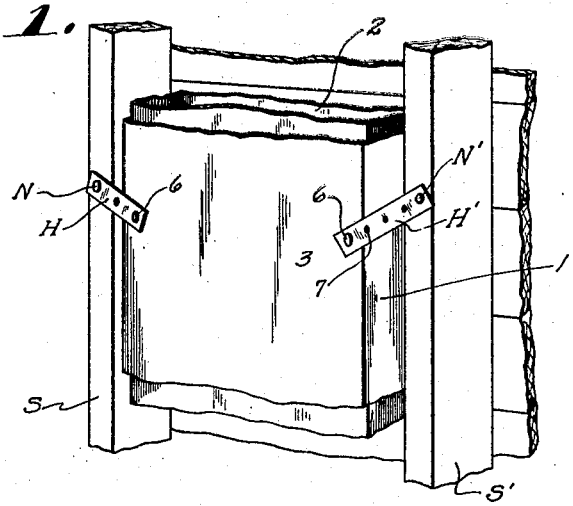
Figure 1 is a perspective view showing the hanger in use in suspending a hot air pipe or flue of double wall construction upon the studding of a building.

Referring to the drawings numeral 1 designates generally a portion of a hot air pipe which has an inner wall 2 and an outer wall 3. The pipe 1 is of any suitable or conventional construction and is usually made up of sections having their ends interfitted or otherwise suitably connected. Usually the pipe is extended through the walls of the building and is positioned between the studs S and S' of such walls.

Figure 2:
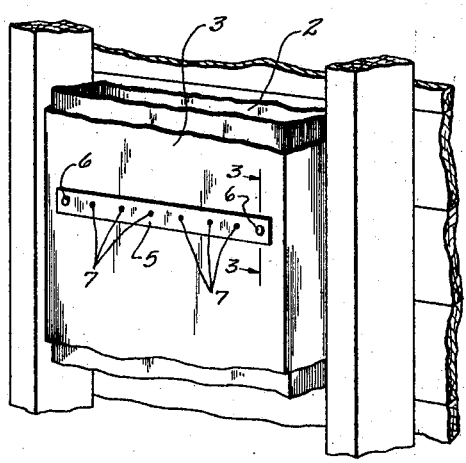
Figure 2 is a similar view showing the hanger as positioned during shipment and during the setting of the pipe.
Figure 3:
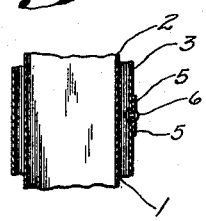
Figure 3 is a sectional view on line 3—3 of Figure 2.

The present invention proposes the provision of supporting means for the pipe and, as shown in Figure 2, this supporting means consists of a flat and elongated strip of metal designated generally at 5 which is laid flush up against the pipe and which has its ends secured to the pipe by means of rivets 6. In between the rivets 6 the strip 5 is provided with a plurality of spaced nail receiving openings 7. The strip 5 may be cut at any point in between the rivets 6 to separate the strip 5 into the hanger sections designated at H and H' in Figure 1. If the pipe is unevenly spaced from the studs, one section is made longer than the other to compensate for this irregular spacing. Thus, in Figure 1 the section H' is somewhat longer than the section H for the reason that the pipe 1 is nearer to the stud S than it is to the stud S'. When the strip has been cut into sections of proper length each section is swung or rotated about its rivet as a pivot to cause the hanger section to project upwardly and outwardly from the pipe and into overlapping relation with respect to the stud. Nails N and N' are then driven through the openings of the hanger sections which are alined with the studs to secure the hanger sections to the studs and to suspend the pipe thereon.

With this construction the supporting means or hanger being positioned entirely within the confines of the pipe, presents no undesirable projection during the time that it is stored, shipped or handled and yet provides in effect hangers of adjustable length which may be conveniently extended from the pipe and secured to the studs of the wall through which the pipe extends.

The invention involves a distinctly novel method of supporting pipe which consists in applying to the pipe a hanger element by securing the ends of the hanger element to the pipe in such manner that the hanger element is held flush up against the pipe, in severing the hanger element intermediate its ends into sections of appropriate length and then positioning the sections in overlapping relation with respect to the studding and securing them to the studding.

The invention claimed is:

1. In combination with a double wall pipe of hot air systems a hanger for suspending the pipe on studding and comprising a flat strip laid flatly against the outer wall of the pipe and having its ends riveted thereto, the strip having a plurality of spaced nail receiving openings in between the rivets and being adapted to be severed at any point in between the rivets to provide hanger sections adapted to be swung around the rivets as pivots and into overlapping relation with respect to the studding.

2. In combination with a pipe, a hanger comprising an element having its ends positively and pivotally connected to the pipe and severable intermediate its ends into hanger sections of appropriate lengths adapted to be rotated into overlapping relation with respect to and secured to supporting structure.

3. A method of supporting pipe including the steps of attaching the ends of a hanger strip to the pipe, severing the hanger strip intermediate its ends to provide hanger sections of appropriate lengths, and fixing the end portions of the hanger sections to a supporting structure.

4. A hanger for pipes comprising a strip positioned flush up against the pipe and located entirely within the confines thereof, fastening devices securing the end portions of the strip to the pipe, said strip being severable intermediate its ends into hanger sections of appropriate lengths adapted to be shifted to project beyond the pipe and to be secured to the supporting structure.

In witness whereof, I hereto affix my signature.

CHARLES M. BULLER.